Oct. 9, 1934.  A. E. McPIKE  1,976,134
MINNOW TRAP
Filed Nov. 21, 1932  2 Sheets-Sheet 1

AUBERT E. McPIKE.
*INVENTOR.*
BY *James R. Cole*
ATTORNEYS.

Oct. 9, 1934.  A. E. McPIKE  1,976,134
MINNOW TRAP
Filed Nov. 21, 1932    2 Sheets-Sheet 2

AUBERT E. McPIKE.
*INVENTOR.*

BY *James R. Leola*
*ATTORNEYS.*

Patented Oct. 9, 1934

1,976,134

UNITED STATES PATENT OFFICE 1,976,134

MINNOW TRAP

Aubert E. McPike, Tulsa, Okla.

Application November 21, 1932, Serial No. 643,651

7 Claims. (Cl. 43—100)

My invention relates to new and useful improvements in minnow traps, and has for its objects: to provide a trap with which to catch minnows faster and in shallower water than with the present form of traps; to provide said trap in form less liable to breakage, and if partly broken may be easily repaired with an extra part contained in the trap available for repair purpose; to provide said trap in form arranged for anchoring it more securely and in which it is less liable to be broken, and may if one of the glass plates therein is broken be easily repaired with an extra plate carried in the trap, and with a removable funnel which may be replaced if broken; to provide a trap wherein a bait box is employed in making the trap more efficient in attracting fish into the trap and holding them therein, and to avoid repeated rebaiting of the trap and further avoid the necessity for removing bait from the minnow bucket into which the minnows may be poured from said trap, which bait if left in the minnow bucket kills the minnows; and to provide the frame and head portion of the trap all of one sheet of metal except for the tie bar or binding plates thereof.

With the above and other objects in view which will appear as the description proceeds, my invention consists in the novel features hereinafter set forth in detail, illustrated in the accompanying drawings and more particularly pointed out in the appended claims.

Referring to the drawings in which numerals of like character designate similar parts throughout the several views:

The drawings are arranged in two groups, the first, comprising Figures 1 to 9 inclusive, being of my trap with removable top and side transparent plates in a one piece frame and removable funnel rear end, and the second, comprising Figures 10 to 14 inclusive, being of my trap head on a moulded glass trap portion.

Fig. 1 is a view of my trap in longitudinal cross section on line A—A of Fig. 2 showing the trap portion with funnel rear end entrance thereto, and the head or front end of the trap having an anchor attachment and in which head is provided an opening through which the minnows may be emptied from the trap, an inlet directly into the trap portion, and a bait box with water inlet thereto in front and positioned low in the bait box with water outlet therefrom into the trap portion and positioned high in the bait box.

Figure 1:
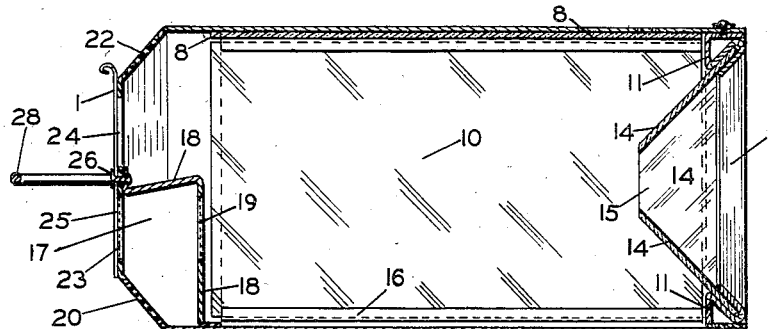
Figure 8:
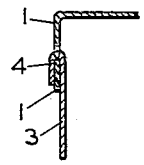
Fig. 8 is a partial cross section on line D—D of Fig. 7 showing how the one piece head and frame of the trap is tied together by a tie bar or plate.
Figure 2:
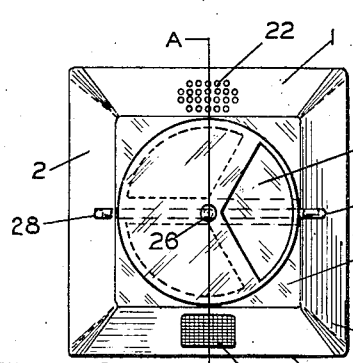
Fig. 2 is a view of the same in front elevation.
Figure 7:
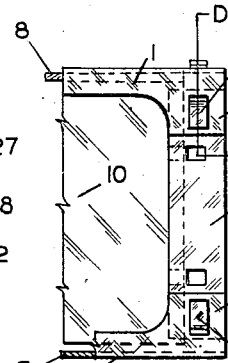
Fig. 7 is a detailed view in side elevation of the framework at the rear end of the trap and showing more fully how the frame is fastened together by a tie bar or tie plate.
Figure 4:
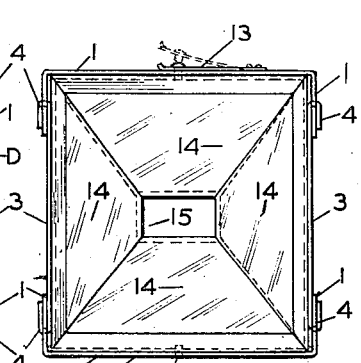
Fig. 4 is a view of the same in rear end elevation.
Figure 3:
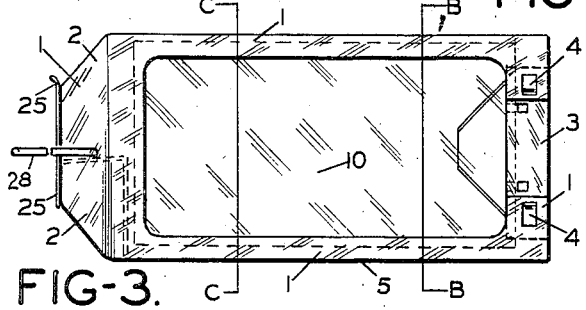
Fig. 3 is a view of the same in side elevation.
Figure 5:
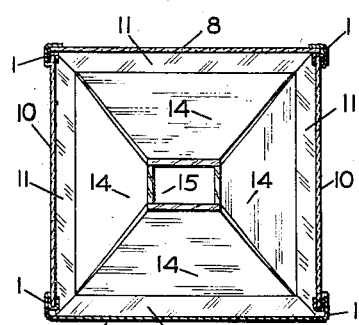
Fig. 5 is a view of the same in cross section on line B—B of Fig. 3, showing the plate construction of the funnel.
Figure 6:
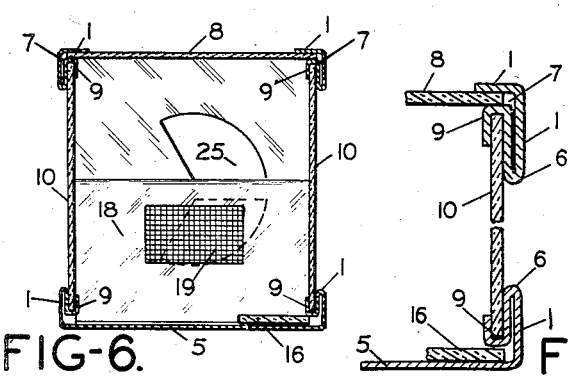
Fig. 6 is a view in cross section on line C—C of Fig. 3 showing a face view of the bait box and showing the frame and plate construction of the top, bottom and side plates of the trap portion proper of the minnow trap.

In the first group of figures 1 represents generally the one piece frame of the trap, including the front end or head 2, which is also of the one piece, and 3 represents the tie bar or tie plate wherewith the entire one piece frame including the head is held together, the ends of plate 3 being looped into the frame plate as shown by loop 4.

Figure 9:
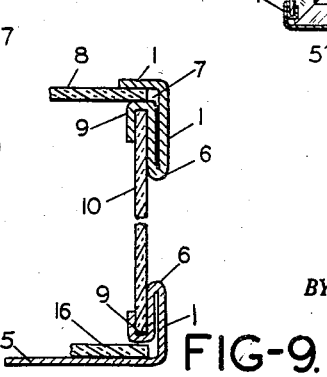
Fig. 9 is a detailed view in partial cross section on line C—C of Fig. 3, enlarging the view of the frame construction shown in Fig. 6.
Figure 10:
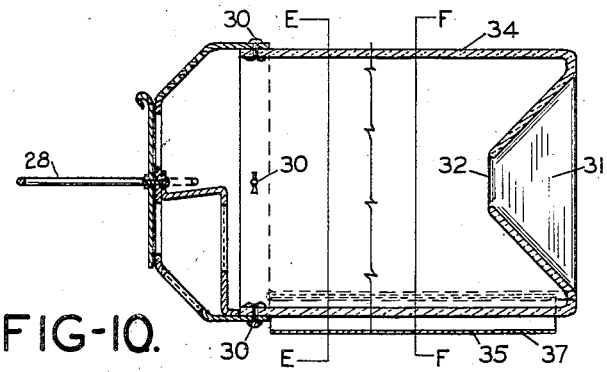
Fig. 10 is a view in longitudinal cross section of the trap head showing the same attached to a square glass trap portion, with a bottom shield for the glass.
Figure 13:
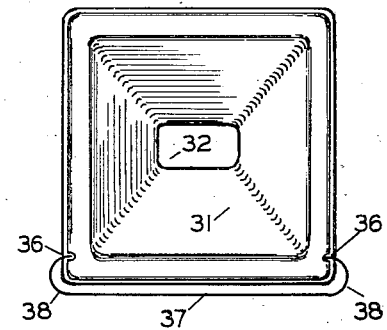
Fig. 13 is a view in cross section on line F—F of Fig. 10.
Figures 11, 14:
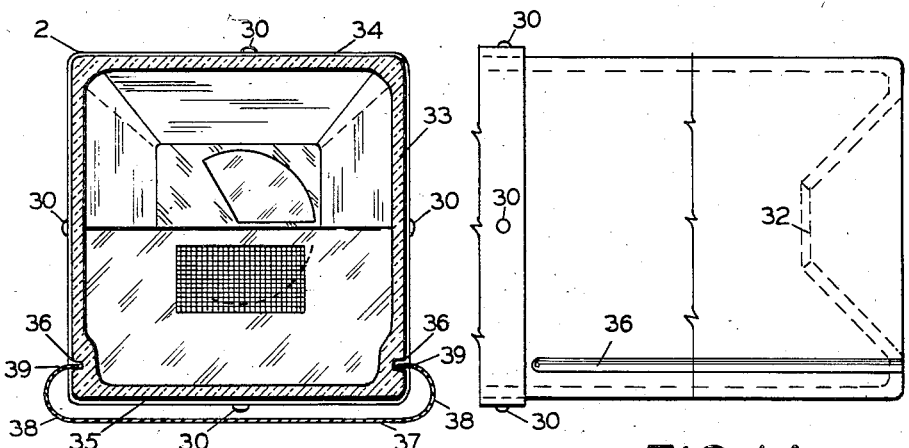
Fig. 11 is a view in cross section on line E—E of Fig. 10, showing the attachment of shield to the glass.
Fig. 14 is a view in side elevation of the glass trap portion proper of said trap as shown in Fig. 10 and showing the means of attaching the shield to said glass portion.
Figure 12:
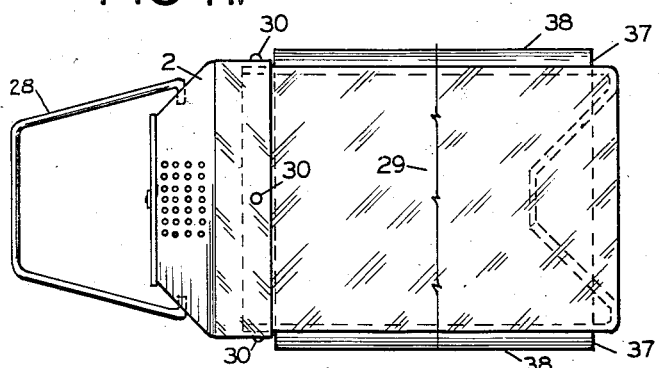
Fig. 12 is a view in top elevation of said trap as shown in Fig. 10.

Preferably the bottom 5 of the trap is formed by the same plate from which frame 1 and head 2 are made and is integral of it. The plate mentioned is cut away at the portions which otherwise would constitute the chief portion of the sides and top of the trap and in cutting this away a surplus portion of the material is left to fold over or crimp as at 6 to provide a groove 7 wherein a plate of glass or other transparent material 8 may be inserted to form the top of the trap proper and to form grooves 9 wherein plates similar to plates 10 may be inserted to form the sides of the trap proper, the detail of which is more clearly shown in Fig. 9.

The construction also shows a bottom groove 9 which is removed from the bottom 5 of the trap the same distance as the top groove 9 is located from the frame portion and this provides for the insertion of an extra glass or other transparent plate 16 which may be inserted into the trap above the bottom thereof. As all of said glass plates 16, 8 and 10 are of the same dimensions, and as bottom 5 is not open to the escapement of the minnows from the trap, the plate 16 is available for use to replace plate 8 or 10 if the same becomes broken.

Directing attention now to the head of the trap, in forming the trap frame 1 and head 2 of one piece, the beveled corners are cut to form or are crimped together and in the head is placed a bait box 17 shown with bait such as meal or flour bread such as crackers or any other minnow bait, which bait box is formed by a plate 18 held in the head in any suitable manner. This plate has a screened opening 19 therein which provides an exit from bait box 17. Preferably the exit 19 is at or near the top of the bait box. The bait box has another screened opening 20 which provides an entrance to said bait box, and which is preferably located near the bottom of the bait box when the trap is lying in normal operating position. With the entrance and exit thus positioned the current of water passing through the bait box will stir the bait therein which action increases the efficiency of the trap very materially.

In the upper beveled portion of the head 2, is another screened opening, such as that formed by perforations 22, through which an additional current of water may pass directly into the trap proper, instead of through the bait box. This provides for an increased flow of water through the trap and out exit 15, which outgoing current carries with it the extremely small bait particles coming from the bait box without unduly disturbing the bait by having all of the water enter the trap through the bait box.

In the face of head 2 is an opening 23 into the bait box, through which opening bait may be placed in the box 17, and an opening 24 through which the minnows may be poured from the trap, with a rotary disk valve 25 pivotally mounted on the face of the head by rivet 26 the valve 25 being adapted to cover both openings 23 and 24 and itself having an opening 27 therein corresponding to openings 23 and 24 to permit a through passage when the opening in said valve is brought into direct relation with either opening 23 or 24.

On the head 2 is a bail 28 which not only provides convenience in carrying the trap, but more particularly serves as an anchor connection to the trap, and the location of such an anchor connection in such place on the trap is a very material aid in firmly anchoring the same.

In the remaining group of figures the same head 2 is used with all of its previously explained features, the various parts being numbered as in the previous group of drawings. However, in this case the head 2 is attached to a square sided glass trap, such as a moulded glass trap represented generally as 29, by means of rivets or staples 30. The funnel 31 with opening 32 moulded integral of the sides 33 and top 34 and bottom 35 to form a one piece glass trap except for the head 2 and its attachments.

On either side of the trap 29 and in sides 33 are grooves 36 and at the bottom of the trap is attached a protecting plate 37 preferably perforated or made of a very heavy wire mesh which is more satisfactory in holding the trap and in preventing it from sliding on the bottom of the bed of the stream, than a solid plate would be; and having its sides 38 upturned and with the edges of said sides ending in a flange 39 adapted to fit tightly into groove 36 and be held therein by a frictional grip.

In operation, the trap is baited, and anchored on the bottom of the stream by attaching a string to bail 28 and an anchor weight to string. In all other minnow traps the anchor is attached to the center portion of the trap which permits the trap to swing about, frequently causing it to break and always turning the head of the trap away from the current so that the flow of water through the trap is diminished. My anchoring connection to the head holds the trap with head up stream at all times, and prevents it from swinging about. With head up stream, there is a maximum and constant flow of tiny bait particles from the bait box through the trap proper, out of the funnel and into the stream, which flow of bait particles attracts the minnows into the trap. Moreover, with anchoring means thus provided the trap is less liable to be moved from its position or broken.

With my arrangement of bait box the flow of the current therethrough, with the head of the box held upstream by its anchoring means aforesaid, stirs or churns the bait therein so that there is a constant flow of bait particles through and out of the trap, which is not the case with any other form of trap.

As bait in the minnow bucket kills the minnows therein and must be removed therefrom after the minnows have been dumped from the ordinary trap into the minnow bucket, my arrangement of bait box is much more convenient, as no bait is dumped from the trap, and a renewal of bait is less frequently required. Moreover, with the ordinary trap, large particles of the bait in the trap frequently flow out of the trap and minnows approaching the trap follow them downstream, which is not true with the operation of my trap. Moreover, with the ordinary trap, minnows in the trap are required to churn or stir the bait therein in order to get the bait particles to flow out of the trap to attract other minnows, whereas with the operation of my trap no minnows are required in the trap for that purpose as the current passing through the bait box stirs the bait to cause this effect, and the bait is kept away from the minnows, which is not the case in any other trap.

When emptying the trap of minnows, the bait in the bait box is not disturbed, and the minnows are dumped through opening 24.

In my trap constructed as shown in group 1 of the drawings, the funnel is removable for cleaning the trap or for replacing broken glass plates, and an extra side or top plate is carried in the trap for replacement use.

Having thus fully described my invention, what I claim and desire to secure by Letters Patent is:

1. In a minnow trap, a bait box positioned in the head thereof, a water entrance in the front of said bait box communicating with the outside of said trap, and a water exit from said bait box communicating with the trap portion proper of said minnow trap.

2. In a minnow trap, a bait box positioned in the head thereof as claimed in claim one, and with said water entrance positioned lower than said water exit when said trap is lying in normal operating position.

3. A minnow trap comprising a square sided trap portion, a funnel entrance in the rear end of said trap portion, a head on the front end of said trap portion, an anchor connection on said head, a bait box in said head, a water entrance into said bait box from without said trap, a water exit from said bait box into said trap portion proper, a water entrance directly into said trap portion proper independent of the opening through said bait box, a door into said bait box, and a door into said trap portion proper.

4. The combination of a minnow trap having a glass trap portion and a flat bottom surface thereto, a shield for said bottom, grooves in said trap portion, and corresponding flanges on said shield adapted to engage said grooves.

5. In a minnow trap having a separable trap portion, a detachable head therefor having a bait box therein wherein is a water entrance thereto communicating with the outside of said trap and also a water exit therefrom communicating into said trap portion and a door in said bait box and with said head also having therein a second water entrance into said trap portion independent of the aforesaid exit from said bait box and a door for said trap portion proper.

6. In a minnow trap, a bait box positioned in the head thereof, a water entrance in the front of said bait box and communicating with the outside of said trap, a water exit from said bait box communicating with the trap portion proper of said minnow trap, and a second water entrance into said trap portion from the exterior of said trap independent of said water exit from said bait box.

7. In a minnow trap, a head portion having a bait compartment therein, a frame portion integral with said head portion, and grooves in said frame portion adapted to receive and hold individual removable plates which constitute the top and side plates of said trap.

AUBERT E. McPIKE.